United States Patent [19]

Suzuki et al.

[11] Patent Number: 5,084,428

[45] Date of Patent: Jan. 28, 1992

[54] METHOD FOR ENHANCING CATION-EXCHANGE CAPACITY OF MONTMORILLONITE DECREASED BY FIXATION OF ION

[75] Inventors: Kenzi Suzuki, Aichi; Toshiaki Mori, Yokkaichi; Yasuji Sakaguchi, Nagoya, all of Japan

[73] Assignees: Agency of Industrial Science & Technology; Ministry of International Trade & Industry, both of Tokyo, Japan

[21] Appl. No.: 482,491

[22] Filed: Feb. 21, 1990

[30] Foreign Application Priority Data

Mar. 6, 1989 [JP] Japan .................................. 1-53580

[51] Int. Cl.$^5$ .............................................. B01J 20/12
[52] U.S. Cl. ................................................... 502/80
[58] Field of Search ................................. 502/80, 85

[56] References Cited

U.S. PATENT DOCUMENTS

| 2,744,057 | 5/1956 | Emmett | 502/80 |
| 4,417,090 | 11/1983 | Heinerman et al. | 502/80 |
| 4,593,135 | 6/1986 | Gregory | 502/80 |

FOREIGN PATENT DOCUMENTS

| 1133918 | 5/1989 | Japan . | |
| 2179563 | 3/1987 | United Kingdom | 502/80 |

Primary Examiner—Carl F. Dees
Attorney, Agent, or Firm—Oblon, Spivak, McClelland, Maier & Neustadt

[57] ABSTRACT

The cation-exchange capacity of montmorillonite decreased in consequence of fixation of ion is restored by subjecting the montmorillonite to a hydrothermal treatment.

3 Claims, 1 Drawing Sheet

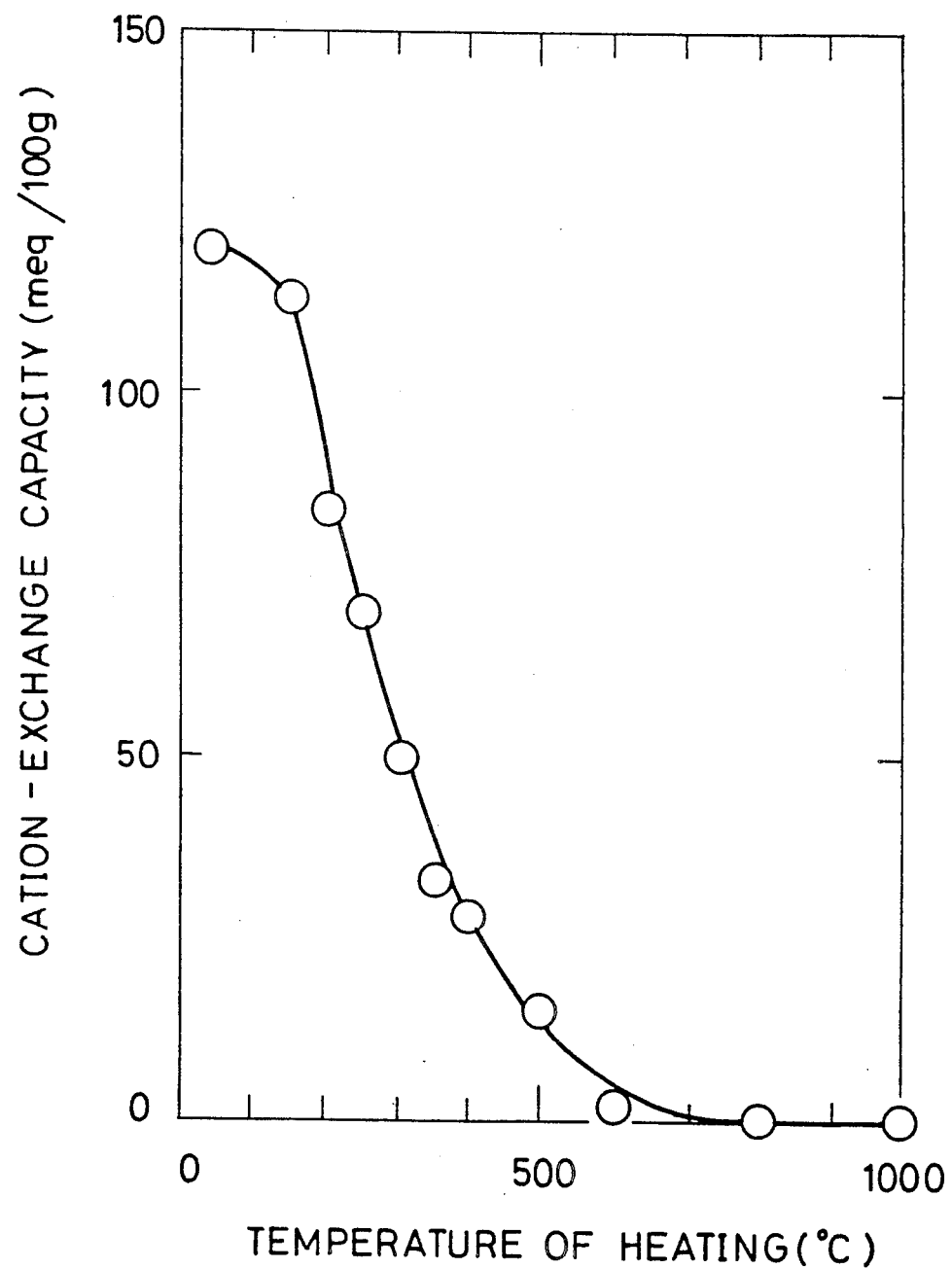

METHOD FOR ENHANCING CATION-EXCHANGE CAPACITY OF MONTMORILLONITE DECREASED BY FIXATION OF ION

BACKGROUND OF THE INVENTION

1. Field of the Invention

Montmorillonite, well-known for its large cation-exchange capacity and high swelling property, is utilized extensively in such applications as ion exchange substance and raw substance for pillared clay. When it is heated, it induces ion fixation and no longer retains usefulness because of consequent loss of its ion-exchange capacity.

2. Prior Art Statement

It is known that the cation-exchange capacity of montmorillonite which is well known as swellable clay decreases when this clay is subjected to a heat treatment. The reason for the decrease of the cation-exchange capacity may be that the interlayer exchangeable cations are caused by the heat to fix fast to the silicate layers and, as the result, the clay no longer retains the exchangeability. A method for controlling the cation-exchange capacity of montmorillonite by virtue of this phenomenon has been developed by the present inventors (Japanese Patent Application SHO 62(1987)-292629 correspond to U.S. application Ser. No. 07/394,969 and Japanese Patent Public Disclosure HEI 1(1989)-133918). A technique for restoring the cation-exchange capacity which has been decreased, however, remains yet to be established.

An object of this invention is to enhance the cation-exchange capacity of montmorillonite which has been decreased in consequence of fixation of ion.

SUMMARY OF THE INVENTION

The present inventors continued a study with a view to fulfilling the object mentioned above. This invention has been perfected as the result.

Specifically, this invention is directed to a method for enhancing the decreased cation-exchange capacity which essentially consists of subjecting montmorillonite, whose cation-exchange capacity has been decreased in consequence of fixation of ion, to hydrothermal treatment thereby allowing the montmorillonite to restore the cation-exchange capacity.

The above and other features and objects of the invention will become apparent with the following detailed description made with reference to the attached drawing.

BRIEF DESCRIPTION OF THE DRAWING

The drawing attached hereto shows the relation between the cation-exchange capacity possessed by nickel montmorillonite and the temperature of heating.

DETAILED DESCRIPTION OF THE PREFERRED EMBODIMENTS

Though the clay to be used in this invention as described herein is montmorillonite, use of montmorillonite is not particularly critical for this invention. Any clay possessing a quality identical to that described hereinafter may be used instead. Montmorillonite is a kind of alumino-silicate. $SiO_2$— tetrahedra, in which four oxygen atoms are in each corner and a silicon atom is in the center of the tetrahedron, are linked bidemensionally in such a way that three oxygen atoms in a basal plane of the tetrahedron are shared. The resultant sheet is called a tetrahedral sheet. $AlO_4(OH)_2$— octahedra are also linked to form a gibbsite-like sheet (octahedral sheet) by sharing oxygen atoms and OH-groups in the octahedron. One octahedral sheet is placed between two tetrahedral sheets in a way that the oxygen atoms of the tetrahedral sheets, remaining unshared, are shared at the corner of the octahedral sheet. The resultant layer consisting of tetrahedral, octahedral, and tetrahedral sheets is called silicate layer. The silicate layers are stacked in a layered fashion to form the crystal structure of montmorillonite. Part of the aluminum which is the center metal of the alumina octahydron in the silicate layer is substituted with a metal having a smaller positive electric charge than aluminum, like magnesium further, part of the silicon of the silicic tetrahydron is substituted with a metal having a smaller positive electric charge than silicon, like aluminum. The substitution leads to an inbalance the silicate of electric charge in the silicate layers and therefore the silicate layers are negatively charged. Cations (such as, for example, $Na^+$ and $Ca^{2+}$) are included between the silicate layers to compensate for the negative charge of the silicate layers. These cations are readily exchanged with other cations. The amount of these cations is called a cation-exchange capacity, which is roughly 130 meq/100 g.

The cation-exchange capacity of montmorillonite is decreased by heating the clay, which is attributed to the fixation of the interlayer exchangeable cations to the silicate layer (ion fixation) caused by the heat. Now, the ion fixation will be explained. The holes surrounded by six oxygen atoms are observed in the basal plane of the tetrahedral sheets in the silicate layers (hexagonal hole). The radius of the hexagonal hole is ca. 2.8 A. When the montmorillonite is heated, the exchangeable cations existing between the silica layers are fixed within the hexagonal holes in the silicate layer and, as a result, fixed cations are not exchanged at all. The degree of this fixation varies with the kind of cation and the heating temperature. The amount of cations to be fixed increase in proportion as the valency of ion increases, the radius of ion decreases, and the heating temperature increases. This fact means that the amount of cations remaining exchangeable decreases, namely that the cation-exchange capacity proportionately decreases. As one example of the ion fixation, the change brought about by heating in the cation-exchange capacity of nickel-montmorillonite possessing a $Ni^{2+}$ ion as an exchangeable cation is shown in the drawing. It is clearly noted from this drawing that the cation-exchange capacity of the nickel-montmorillonite gradually decreased with the rise of the heating temperature and reached 0 when the temperature reached 600° C.

This invention resides in providing a method for allowing montmorillonite, whose cation-exchange capacity has been decreased in consequence of ion fixation, to restore the cation-exchange capacity. After a careful study, the present inventors have found that the montmorillonite which has the cation-exchange capacity thereof decreased by the ion fixation is allowed to restore the cation-exchange capacity by subjecting the montmorillonite to a hydrothermal treatment. Since the hydrothermal treatment is carried out by the use of an autoclave, the autoclave will be explained. The autoclaves come in four types, i.e. stationary type, internal stirring type, shaking type, and rotary type. For use in this invention, the stationary type autoclave suffices because of its simple construction. The stationary type autoclave will be explained further in detail. It is prevalently in a vertical structure and is composed of a tightly sealed cylindrical shell of steel, a pressure gauge, and a safety valve. It is used by a simple method comprising the steps of filling the tightly sealed shell with water, examining the shell to confirm its tightness of closure, and heating the autoclave at a proper temperature.

The degree of restoration of the cation-exchange capacity of montmorillonite or the degree of ion liberation from the fixation varies with the conditions of hydrothermal treatment, such as temperature, pressure, and time. Under mild conditions of treatment (low temperature, low pressure, and short time), the degree of ion liberation from fixation is small, while under harsh conditions (high temperature, high pressure, and long time), the degree is large. Though the hydrothermal treatment is desired to be carried out by the method using an autoclave described above, it may be performed by any of the other methods which are capable of providing an effective hydrothermal treatment.

Though the conditions for this hydrothermal treatment are variable with the factors mentioned above, practically the pressure is in the range of 1 to 150 kg/cm$^2$ and the temperature in the range of 100° C. to 350° C.

The species of montmorillonite for which the method of this invention is applicable include nickel montmorillonite, sodium montmorillonite, calcium montmorillonite and aluminum montmorillonite, for example.

The method of this invention allows the cross-linked clay interlayer compound synthesized by use of an ion-exchange reaction to restore the cation-exchange capacity decreased by heat. Thus, it aids this compound immeasurably to find extensive utility in fields requiring use of porous articles.

Now, this invention will be described more specifically below with reference to working examples.

EXAMPLE 1

In a beaker, 1.0 g of nickel montmorillonite retaining a cation-exchange capacity of 0.24 meq/g after heating was placed. In an autoclave, the sample in the beaker was subjected to a hydrothermal treatment at a temperature of 150° C. under a pressure of 3.5 kg/cm$^2$ for 3 hours. After this hydrothermal treatment, the sample exhibited a cation-exchange capacity of 0.40 meq/g, representing a restoration to about 1.7 times the capacity before the treatment.

EXAMPLE 2

In a beaker, 1.0 g of nickel montmorillonite retaining a cation-exchange capacity of 0.036 meq/g after heating was placed. In an autoclave, the sample in the beaker was subjected to a hydrothermal treatment at a temperature of 150° C. under a pressure of 3.5 kg/cm$^2$ for 3 hours. After this hydrothermal treatment, the sample exhibited a cation-exchange capacity of 0.12 meq/g, representing a restoration to about 3.5 times the capacity before the treatment.

EXAMPLE 3

In a beaker, 1.0 g of nickel montmorillonite retaining a cation-exchange capacity of 0.20 meq/g after heating was placed. In an autoclave, the sample in the beaker was subjected to a hydrothermal treatment at a temperature of 185° C. under a pressure of 9.5 kg/cm$^2$ for 24 hours. After the hydrothermal treatment, the sample exhibited a cation-exchange capacity of 1.14 meq/g, representing a restoration to about 5.7 times the capacity before the treatment.

EXAMPLE 4

In a beaker, 1.0 g of nickel illonite retaining a cation-exchange capacity of 0.056 meq/g after heating was placed. In an autoclave, the sample in the beaker was subjected to a hydrothermal treatment at a temperature of 185° C. under a pressure of 9.5 kg/cm$^2$ for 24 hours. After the hydrothermal treatment, the sample exhibited a cation-exchange capacity of 0.60 meq/g, representing a restoration to about 11 times the capacity before the treatment.

What is claimed is:

1. A method for enhancing the cation-exchange capacity of montmorillonite decreased in consequence of fixation of ion, which essentially consists of subjecting said montmorillonite to a hydrothermal treatment wherein said hydrothermal treatment is carried out under a pressure in the range of 1 to 150 kg/cm$^2$ at a temperature in the range of 100° to 350° C.

2. A method for according to claim 1, wherein said hydrothermal treatment is carried out in an autoclave.

3. A method for according to claim 1, wherein said montmorillonite is at least one species selected from the group consisting of nickel montmorillonite, sodium montmorillonite, calcium montmorillonite and aluminum montmorillonite.

* * * * *